(12) United States Patent
Thornton

(10) Patent No.: X988
(45) Date of Patent: Jan. 16, 1809

(54) BOILERS, STEAM,& BOATS/STEAM BOAT

(76) Inventor: William Thornton

[illegible] in [illegible] and [illegible]
[illegible]
[illegible]

[illegible] most improved
[illegible]
[illegible]
[illegible]
[illegible]
[illegible] Diameter [illegible] always one way, [illegible]
[illegible] runs the endless chain [illegible]
[illegible] wheel of smaller diameter, [illegible]
[illegible] is a crank that [illegible] the Boat,
just on the outside of the [illegible] the upper end of the [illegible] is attached to
[illegible] which forms a joint and these arms are [illegible] at the other end [illegible]
under a Frame which extends across the [illegible] of the Boat and the [illegible]
[illegible] arms attached to the Frame are to be [illegible]
[illegible]
[illegible] may be [illegible] without the intervention of a chain,
[illegible] near the [illegible] without the [illegible] in the same man-
ner, by the power of the Engine before mentioned [illegible] wheels, cat[illegible]
[illegible] on a straight axis with [illegible] or [illegible] may be [illegible]
ed and substituted for the [illegible] which what I claim as my particular Invention in
[illegible] of [illegible] wheels at the sides of a Boat as now practised [illegible] as this [illegible]
may be made much larger in diameter without being any incumbrance, and nothing in
the [illegible] of the Boat [illegible] in smooth water [illegible] the boat [illegible] a wind [illegible]
not [illegible] affected and it will not [illegible] wind as in the mode now practised.
especially if the wheel be made with [illegible] to the [illegible] of an open wheel, so that they will
[illegible] the water, but will fall flat above & give little or no opposition to the wind. The
Diameter of the wheel will be proportioned to the power of the Engine, and the force or rapidity
of the movement required. Another principal Improvement in Steam Boats is the application
of my Boiler, [illegible] that they be made light, [illegible] generate a great
quantity of Steam and at the same time be free from all danger of setting the Boat on Fire.

To obtain all these ends I have used a Boiler constructed in the following manner [illegible] an exterior cylindrical case made of copper or any other proper metal [illegible] [illegible] [illegible] with [illegible] [illegible] [illegible] [illegible] [illegible] [illegible] [illegible] [illegible] [illegible] [illegible] [illegible] [illegible] [illegible] and strengthened by cross pieces of iron [illegible] [illegible] [illegible] [illegible] [illegible] [illegible] [illegible] [illegible] [illegible] [illegible] [illegible] [illegible] [illegible] [illegible] [illegible] [illegible] [illegible] in the proportion of [illegible] in diameter to six or seven feet in length. Within this is a cylinder made of strong copper or other metal, in the same form as the outer cylinder but much smaller being less than [illegible] [illegible] [illegible] diam^r in the above proportion so that the inside cylinder can be [illegible] [illegible] [illegible] [illegible] [illegible] [illegible] [illegible] the cylinder lies on its side or horizontally; to give room in the [illegible] [illegible] [illegible] the other side with [illegible] under water when in operation. [illegible] [illegible] [illegible] [illegible] [illegible] [illegible] [illegible] [illegible] [illegible] between the cylinders, the exit of the flue is in front of the Boiler [illegible] [illegible] [illegible] [illegible] [illegible] grate [illegible] [illegible] or any other metal with [illegible] [illegible] [illegible] under and [illegible] [illegible] the inside of the interior Cylinder, with upright pieces to give additional [illegible] [illegible] [illegible] or the bars of the [illegible] may be made of iron or copper, or other metal, [illegible] and [illegible] [illegible] or soldered with hard solder or otherwise made tight into the sides of the interior cylinder with the ends open, so as to permit the water of the Boiler to pass through and thus prevent the Bars from melting, & thus also increasing the Steam in a very great degree; or the Bars or [illegible] may be made hollow, and communicate with the hollow sides & back of a fire place for heating water or air, and not merely the Water, and have an opening or openings so as to permit the air to blow into the Fire. These bars may run across, or if open to the air to cool them lengthwise, and may go about half way in, if the Boiler be in the proportion and of the size mentioned. but may be regulated by the wood or other fuel if on a large scale; and where the fuel is to be checked Bars may go across made in the same way as the others, either hollow or solid; and thus a Chamber will be left behind the Fire in which the smoke will be consumed and give out an abundance of Caloric. To force the air through the Fire a check must be placed under the Fire at the end of the grate, so as to fill up the space underneath, and cut off the communication of air into the chamber except through the Fire. This may be a plate of cast iron or other metal or substance that will stand Fire. It is kept in its place by small knobs, lumps, uprights or [illegible] on each side.

The flue rises near the back of the interior Cylinder, and carries the unconsumed vapor out; and if the flue be in due proportion to the Fire place, nothing is seen at its termination, which may be some feet above the Boiler, but a light trembling vapor, without any smoke whatever after the Fire is in full operation. This flue is also of copper, or other metal. We found that a good proportion for its diameter is the [illegible] of the [illegible] of the [illegible] of the [illegible]. There must be a door to the fire place, and [illegible] [illegible] the sides of the strengthening [illegible] [illegible] to the [illegible] and [illegible] the edge of the cylinder [illegible] on each side. The [illegible] [illegible] and a [illegible] must be [illegible] the [illegible] of the water [illegible] must be [illegible] cylinder [illegible] made [illegible] and [illegible] for the [illegible] of the steam. The supply of water [illegible] given by a forcing pump worked by the engine, [illegible] near the bottom of the water and the steam may [illegible] from the upper [illegible] part of the steam chamber which [illegible] of the Boiler. The outside case [illegible] which [illegible] the cylinder of the engine may be [illegible] the [illegible] many other [illegible] which are bad conductors of heat, confined [illegible] meet. If the inner cylinder [illegible] near to the [illegible] they must be made longer that where the [illegible] of the [illegible] the heat may be more [illegible] and the Steam Chamber may be a [illegible] or other [illegible] form. The [illegible] in a line over the [illegible], [illegible], that the water may be [illegible]. If [illegible] made to [illegible] proportions this Boiler will act like an air furnace, and will burn any kind of fuel, which indeed [illegible] in [illegible] the application of the [illegible], [illegible] Rhode Island, upper James River, or Susquehanna Coal, all of which are of the [illegible] kind, difficult to burn without a blast, or without a fire-place of such construction as to occasion a great draft of air, but when burning give out a very great degree of heat and consequently become peculiarly adapted [illegible] other fuel for navigation, as they possess the power or quality of supplying a large quantity of caloric in a small space, compared [illegible] fuel. The application of these Boilers to Steam engines to other purposes, I also claim. A Boiler of the foregoing proportions will amply supply a cylinder of about [illegible] in. diameter. The steam engine may be placed in any part of the Boat, but for passage Boats I think near the middle [illegible], that they may be more in trim. If the Boat be fast, it is less material. The Boats I would use should be long in proportion to their breadth [illegible], [illegible]ing narrower behind. It will be proper also to have the Boiler [illegible] large [illegible] to work with a sufficient quantity of steam rather than [illegible] high power for if the first be provided the other will be [illegible] the command of circumstances. The force of steam may be then applied to Boats [illegible], or flat bottomed, either single or double, & with or without sails, [illegible]

either behind or in any other manner.

Witnesses.

Stephen Pearson.

C. G. Brent.

William Lawton.

Patent dated 16th. January 1809.

Received and Recorded same Day & Date.

2,000 words